United States Patent [19]
Zuidberg

[11] Patent Number: 5,263,624
[45] Date of Patent: Nov. 23, 1993

[54] APPARATUS FOR LONGITUDINALLY DRIVING AN ELONGATE BODY

[75] Inventor: Herman M. Zuidberg, Rijnsburg, Netherlands

[73] Assignee: Fugro-McClelland Engineers B.V., Netherlands

[21] Appl. No.: 837,673

[22] Filed: Feb. 14, 1992

Related U.S. Application Data

[63] Continuation of Ser. No. 595,546, Oct. 11, 1990, abandoned.

[30] Foreign Application Priority Data

Nov. 7, 1989 [NL] Netherlands ............... 8902747

[51] Int. Cl.⁵ ............................................. B65H 20/20
[52] U.S. Cl. ................................. 226/190; 226/171; 226/173; 226/181; 226/187
[58] Field of Search ............... 226/168, 170, 171–173, 226/76, 181, 182, 190

[56] References Cited

U.S. PATENT DOCUMENTS

| | | | |
|---|---|---|---|
| 610,353 | 9/1898 | Hallidie | 226/190 |
| 755,006 | 3/1904 | Hoxie | 226/190 X |
| 3,360,648 | 12/1967 | Cornish et al. | 226/168 X |
| 3,687,271 | 8/1972 | Lindblom | 226/192 X |
| 4,192,075 | 12/1988 | Umlaut | 226/172 |
| 4,817,845 | 4/1989 | Franchuk | 226/172 |
| 4,886,454 | 5/1908 | Wood | 226/190 |

FOREIGN PATENT DOCUMENTS

| | | | |
|---|---|---|---|
| 2233218 | 1/1974 | Fed. Rep. of Germany | 226/172 |
| 1426898 | 12/1965 | France . | |
| 1476170 | 2/1967 | France . | |
| 0267245 | 10/1981 | Japan | 226/76 |
| 0593789 | 2/1978 | U.S.S.R. | 226/190 |
| 1351277 | 4/1974 | United Kingdom . | |

Primary Examiner—Daniel P. Stodola
Assistant Examiner—Paul Bowen
Attorney, Agent, or Firm—Kinney & Lange

[57] ABSTRACT

Apparatus for longitudinally driving an elongate body (1) such as a rod or tube, comprises two opposed wheels (2) adapted to clamp the body (1) between them. The wheels (2) have an axis of rotation (3) lying substantially in a transverse plane of the elongate body (1). A drive (1) drives at least one of the wheels, wherein the wheels are adapted to transform the rotating movement of the wheels into a translating movement of the elongate body by means of friction. According to the invention the wheels (2) include a plurality of successive movably mounted intermediate pieces (12) circulating with the wheels and being supported by the wheels during the engagement with the body (1), the intermediate pieces (12) successively enabling the wheels (2) to engage the elongate body (1) a distance in longitudinal direction.

19 Claims, 3 Drawing Sheets

APPARATUS FOR LONGITUDINALLY DRIVING AN ELONGATE BODY

This is a continuation of application Ser. No. 07/595,546 filed on Oct. 11, 1990, abandoned as of the date of this application.

The invention relates to an apparatus for longitudinally driving an elongate body, comprising at least two wheels, a first wheel and a second wheel, adapted to clamp the body between them, the wheels each having an axis of rotation lying substantially in a transverse plane of the elongate body; means engaging the first wheel to force it toward the second wheel; driving means for driving at least one wheel, wherein the wheels being adapted to transform a rotating movement of the wheels into a translating movement of the elongate body by means of friction, each wheel including a plurality of successive, movably mounted intermediate pieces circulating with the wheel and being supported by the drivably urged by the wheel during engagement with the body, the intermediate pieces thereby successively enabling the wheel to engage the elongate body for a distance in a longitudinal direction of movement of the elongate body.

In a known embodiment of such an apparatus (see e.g. U.S. Pat. Nos. 3,331,240 and 1,476,170) there are provided two wheels disposed on opposite sides of the elongate body to be driven, the wheels engaging to the elongate body with their outer circumference. The wheels are adapted to exert a normal force towards each other and perpendicular to the longitudinal axis of the body so as to clamp the body between the wheels. By exerting a torque on at least one of the wheels a friction force is produced at the position of the contact between the wheels and the elongate body, said friction force being equal to the multiplication of the normal force and the prevailing coefficient of friction.

The effectiveness of the working of this known apparatus is restricted by a number of factors. For instance, the normal force on the body to be driven, if it is hollow, should be smaller than the force which would cause a flattening or compression of the hollow body as a consequence of the existence of a plastical bending force in the portion of the circumference of the body not supported by the wheels. Further the normal force should be smaller than the force which would cause too much permanent deformation of the body or the wheels in the area of contact. This deformation will set-in if the normal stress, that is the normal force per unit area, is too high. In case of a cylindrical body and a wheel having a flat circumference the contact area will only be a point when a low normal stress exists, and between such a wheel and a square body there will be an area of line contact. Both areas will expand to a slightly larger area as a consequence of elastic deformation of both surfaces. It is indeed possible to enlarge the contact area with bodies having a curved cross-section, and consequently to increase the admissible normal force, by adapting the surface of the wheel circumference to the cross-section of the body. However, as a result thereof differences in speed will set-in on the outer circumference of the wheel causing a plastic strain on the circumference of the body and/or the wheel, which also results in a restriction of the normal force.

On the other hand, there are known apparatuses for longitudinally driving an elongate body (see e.g. FR-A1,426,898 or GB-A-1,351,277), wherein there is used a pair of chains circulating about drive wheels and to which drive blocks are attached, or there are used drive blocks circulating within a guide and being driven by drive wheels. To press the drive locks to the elongate body pressure means are provided between the drive wheels. In case of said GB-A-1,351,277 this pressure means consist of circulating balls or rollers rolling along a track, the drive blocks moving along said balls or rollers during their engagement with the elongate body. These pressure means make the apparatus very complicated, while there are many points of friction within the apparatus.

It is an object of the present invention to provide an apparatus of the type mentioned in the preamble, wherein the drawbacks of the several known apparatuses are removed.

For this purpose the apparatus according to the invention is characterised in that the wheel includes a plurality of successive movably mounted intermediate pieces circulating with the wheel and being supported by the wheel during the engagement with the body, the intermediate pieces successively enabling the wheel to engage the elongate body a distance in longitudinal direction.

In this way it is possible to enlarge the area of contact in the longitudinal direction of the body in comparison to the direct engagement of the wheel and the elongate body, so that the normal stress is lowered for a given total normal force, or the admissible normal force is increased. Furthermore it is no problem to adapt the configuration of the intermediate piece to the cross-section of the body to be driven, so that a body is engaged around a substantial part of its circumference as no differences in speed along the circumference of the elongate body and hence no plastic strains can set-in.

With respect to the known apparatuses having drive blocks and separate pressure means a substantial simplification is obtained because the intermediate pieces are urged to the elongate body by the wheel itself, so that the intermediate pieces do not move tangentially with respect to the surface of the pressure means and consequently sliding friction does not occur.

Preferably the intermediate pieces are provided about or on the circumferences of the respective wheel. The intermediate pieces have a configuration on their sides facing the wheel that allow the pieces to roll thereon.

Due to this feature each intermediate piece may be driven parallel to the elongate body during a portion of a revolution of the wheel without requiring additional measurements to keep the distance between the axis of rotation of the wheel and the surface of engagement of the intermediate piece to the elongate body constant.

It is preferred to keep the intermediate pieces interrelated with respect to the wheel and to load them to a central position by means of an elastic means.

This enables a movement of the intermediate pieces with respect to the wheel on one hand, while a uniform distribution of the intermediate pieces about the wheel is insured on the other hand. The elastic means may be provided both between the wheel and the separate intermediate pieces and between the intermediate pieces themselves.

It is favorable when the wheel is provided at its circumference with a toothing or the like, the intermediate pieces being also provided on their side facing the respective wheel with a toothing or the like which is in engagement with the toothing or the like of the respective wheel in the operative position of the respective intermediate piece.

The meshing toothings or the like of the wheel and the respective intermediate pieces prevent slippage between the wheel and the intermediate pieces and increase the maximum transmissible tangential force on the intermediate pieces.

An advantageous embodiment of the invention is characterised in that there is provided a guide for the intermediate pieces next to the wheel, the guide being adapted to bring and hold the intermediate pieces into engagement with the elongate body during a part of a revolution of the wheel.

In this manner the movements of the intermediate pieces for temporarily aligning them with the elongate body on behalf of the driving are controlled by the guide.

Herein it is possible that the guide comprises cam plates disposed on either side of the wheel and having a portion parallel to the direction of movement of the body, as well as a run-on and run-off portion, and the intermediate pieces having cams cooperating with the cam plates.

The invention will hereafter be elucidated with reference to the drawing showing embodiments of the invention by way of example.

Figure 1:
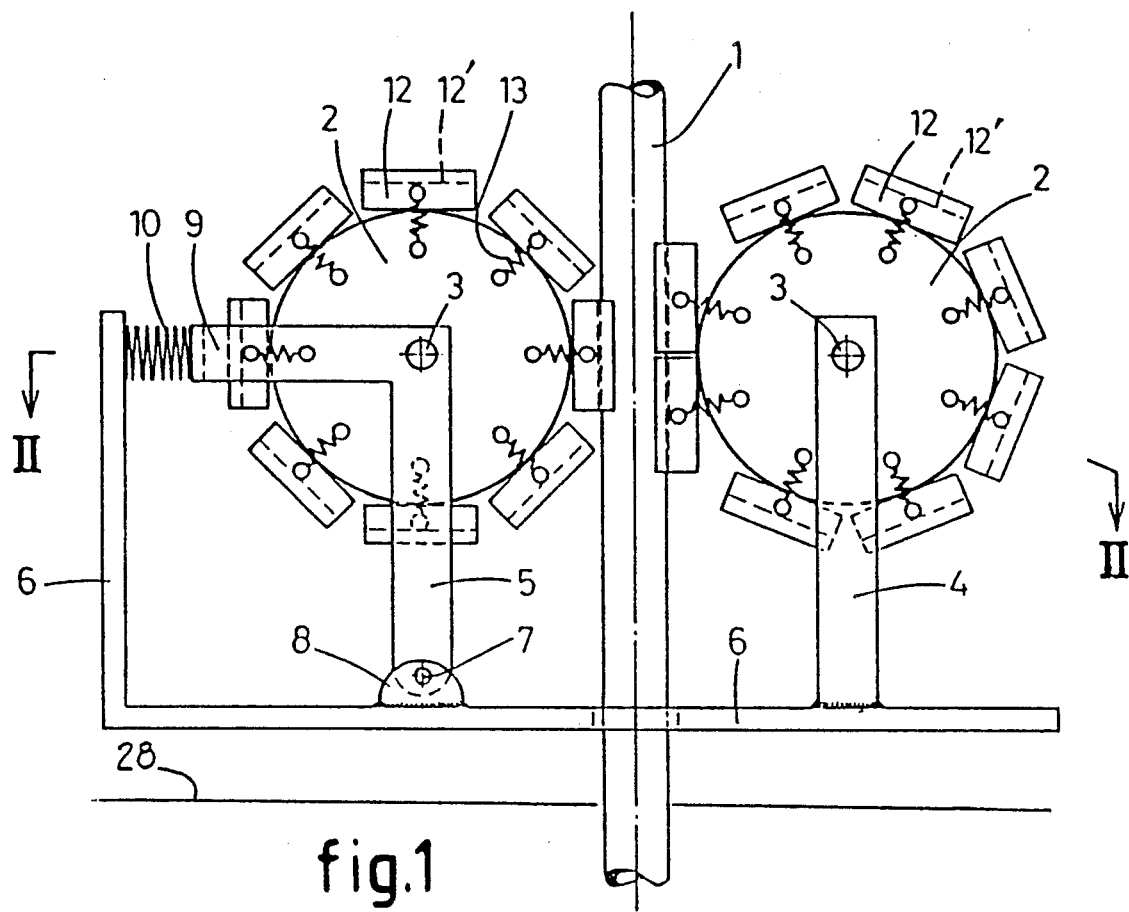
FIG. 1 is a very schematic side view of an embodiment of an apparatus for longitudinally driving an elongate body according to the invention.
Figure 3:
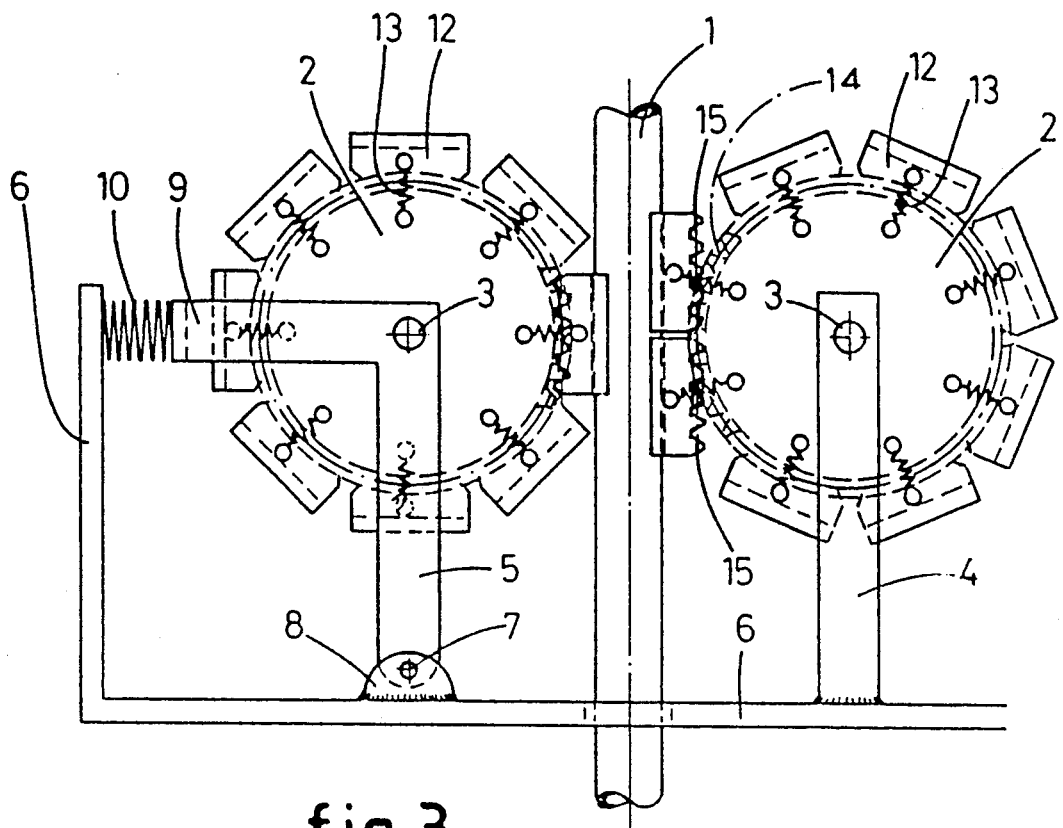
Figure 4:
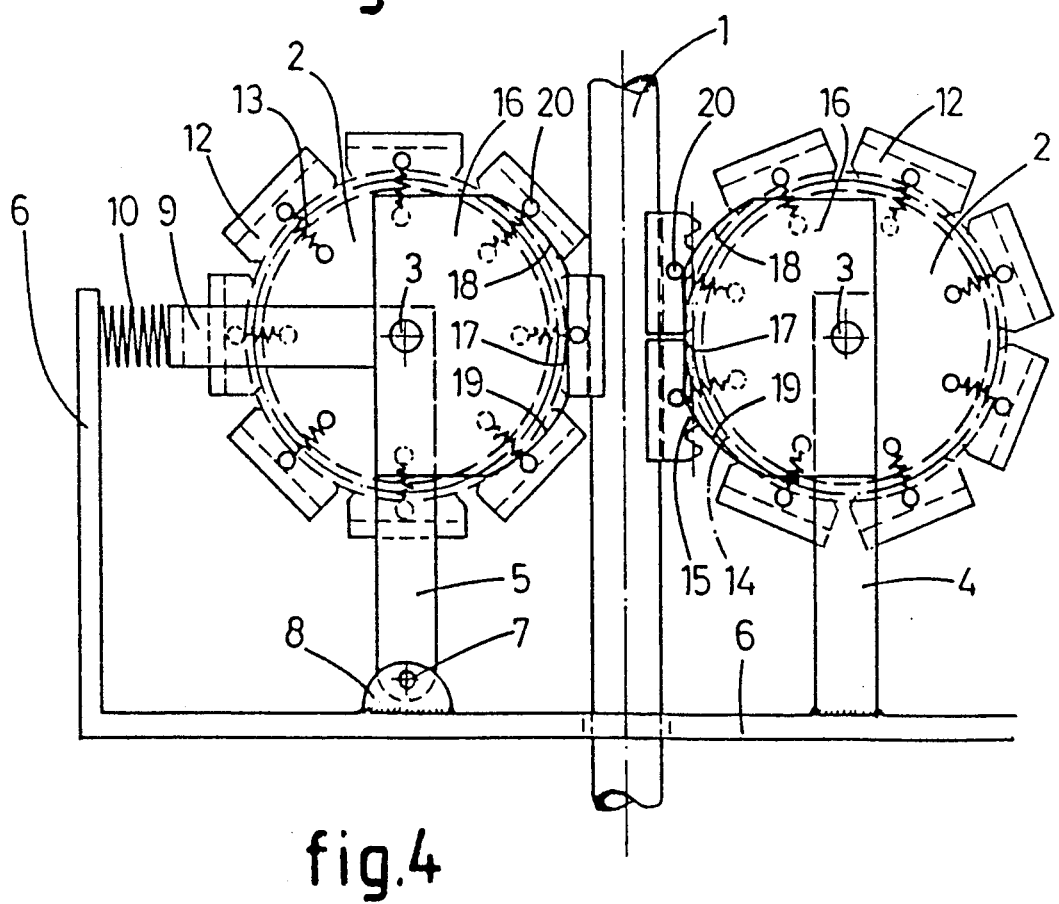
Figure 5:
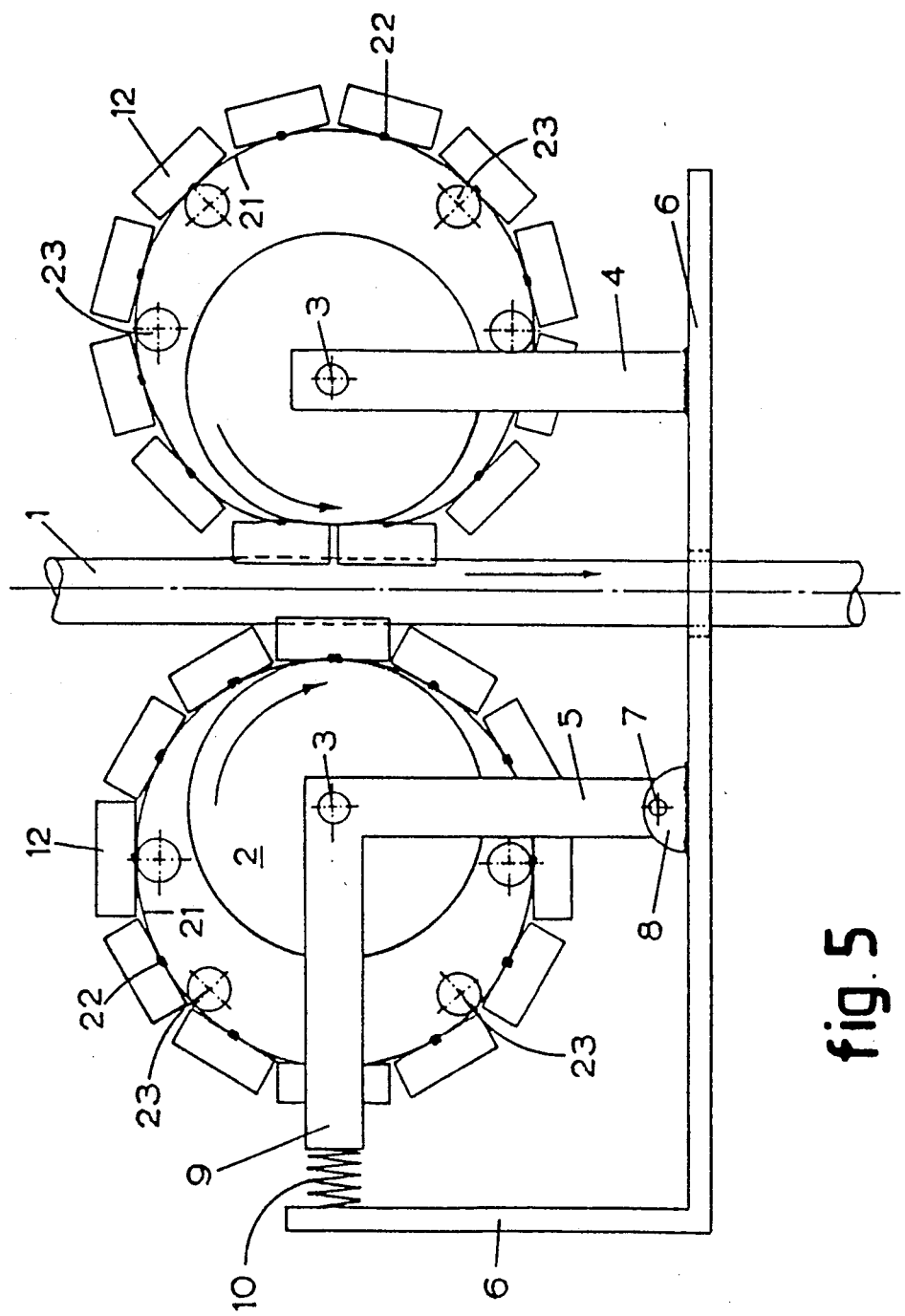

FIG. 3, 4, and 5 are very schematic side views corresponding to FIG. 1 and showing modified embodiments of the apparatus for longitudinally driving an elongate body according to the invention.

Figure 2:
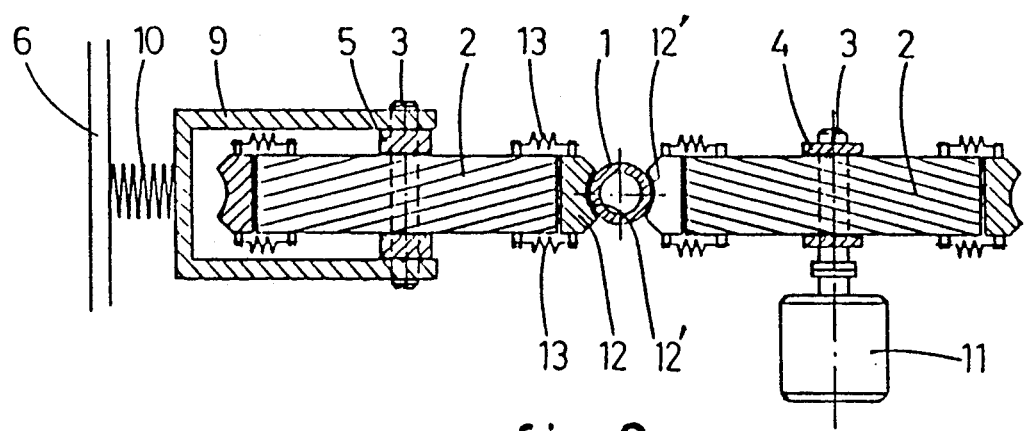
FIG. 2 is a sectional view along the line II—II of FIG. 1.

FIG. 1 and 2 show a first embodiment for longitudinally driving an elongate body, in particular a tube 1. This apparatus is particularly intended to push into and pull out of the soil 28 a string of rods or tubes for soil investigation, particularly logging. Of course it is also possible to use the apparatus for other purposes. For instance is it possible to use the apparatus for running-in of maintenance tools into drilling holes of oil or gas wells. The apparatus may also be used in oil exploration and drilling operations, wherein often tubes are hoisted and run-in and pipelines are sunk-down to the bottom of the sea. It is also contemplated to use the apparatus with several other industrial processes in which tubes or other elongate bodies of arbitrary cross-section have to be pushed into or pulled out of a machine or medium.

The apparatus comprises two aligned and spaced wheels 2. The wheels 2 form between them a nip for the tube 1. The wheels 2 have axes of rotation 3 lying substantially, in a transverse plane of the tube 1. The wheels 2 are journalled with their rotary shafts 3 in supports 4, 5 respectively. The support 4 consisting of two standards is fixed on a stationairy frame 6. Contrary thereto the support 5 is pivotable about a pivot shaft 7 parallel to the rotary shafts 3 and being connected to the stationary frame 6 through a mounting 8. The support 5 has further a cross beam 9 to which a load means 10, in this case a helical spring, engages, the load means 10 being supported by the frame 6 and being adapted to load the respective wheel 2 in the direction to the opposite wheel 2 such that the tube 1 can be clamped between both wheels 2. Of course it is possible to use other load means rather than a helical spring 10, such as pneumatic or hydraulic jacks or the like.

At least one of the wheels, in this case the stationary supported wheel 2, may be driven by means of a suitable motor 11, possibly with an interposed transmission means.

At the circumference of both wheels 2 is disposed a plurality of uniformly spaced intermediate pieces 12, which are movably connected to the respective wheels 2. In the case shown, the intermediate pieces, which have a flat configuration at their side facing the wheel 2, may roll on the circumference of the wheel 2 wherein on either side of the wheel 2 and the respective intermediate pieces 12 springs 13, which engages to the wheel 2 on the one hand and to one of the intermediate pieces 12 on the other hand, load the intermediate pieces 12 to a central position. The force transmission between the wheel 2 and the respective intermediate pieces 12 as well as between the intermediate pieces 12 and the tube 1 takes place by means of friction and possible also microcontact.

The intermediate pieces 12 are adapted on their side 12' facing away from the wheel 2 to the outer circumference of the tube 1 such that the intermediate pieces 12 are able to grip the tube 1 around a portion of the outer circumference thereof and possibly may fully surround the tube 1. Furthermore, the intermediate pieces 12 can also grip the tube 1 along a distance in longitudinal direction thereof corresponding to the length of the intermediate pieces 12. In this manner a substantial area of contact between the operative intermediate pieces 12 and the tube 1 and consequently between the wheels 2 and the tube 1 is created. In this way a large normal force can be exerted by the wheels 2 on the tube 1 without incurring high normal stresses to the tube 1 which would inadmissibly deform this tube 1.

As appears from FIG. 1, the number of intermediate pieces 12, in this case eight, and the length thereof are chosen such that always at least one intermediate piece 12 of each wheel 2 is in engagement with the tube 1 to be driven so that always a sufficiently large driving force is exerted onto the tube 1.

FIG. 3 shows a modified embodiment of the apparatus for longitudinally driving the tube 1, wherein both wheels 2 are provided on their circumference with a toothing 14, while the intermediate pieces 12 comprise on their side facing the respective wheel 2 a rectilineal-face toothing 15 meshing with the toothing 14 of the respective wheel 2. The toothings 14 and 15, preferably rolling truly on each other, may be formed over the whole width of the contact area between each wheel 2 and the respective intermediate pieces 12, but it is of course also possible to form the toothings 14 and 15 only in a portion of the width of this area and construct the remaining portion as a flat tread. Due to the provision of the toothings 14 and 15 the risk of slippage between the wheel 2 and the respective intermediate pieces 12 is eliminated, while it is also possible for the wheel 2 to exert a larger tangential force on the intermediate pieces 12.

FIG. 4 shows a further development of the apparatus for longitudinally driving the tube 1. There is provided on either side of each wheel 2 a guide for the intermediate pieces 12, which brings the intermediate pieces 12 into engagement with the tube 1 in a controlled manner. This guide consists of cam plates 16 placed on either side of each wheel 2 and being fixed to the supports 4, 5 respectively and having a portion 17 extending parallel to the direction of driving of the tube 1, as well as a run-on and run-off portion 18, 19 respectively. The intermediate pieces 12 include on both sides laterally projecting cams 20 disposed in the longitudinal center thereof and passing along the run-on and run-off portions 18 and 19 and along the straight portion 17 of the cam plates 16 when the respective wheel 2 is rotated. By means of the cam plates 16 the intermediate pieces 12 come gradually into and out of engagement with the wheel 2 on the one hand and with the tube 1 on the other hand.

FIG. 5 shows a further embodiment of the invention, wherein the intermediate pieces 12 are not fastened to a respective wheel 2, but are interconnected by an elastically bendible element 21 or maintaining the interrelationship between the intermediate pieces 12. In the case shown the flexible element 21 consists of a steel band to which each of the intermediate pieces 12 are fixed by means of a screw 22 or an other fastening means. The length of the steel band 21 is substantially greater than the circumferential length of the respective wheel 2, while each band 21 is guided over a plurality of guide rollers 23. It is, however, also well possible to make the length of the steelband 21 only slightly larger than the circumferential length of the wheel 2, and, certainly in that case, one may work without guide rollers 23. As always at least one intermediate piece 12 is clamped between the respective wheel 2 and the elonguate body 1 there is no necessity for a connection between the intermediate pieces 12 and the wheel 2, provided that the friction between the pressed intermediate pieces and the wheel 2 is sufficient for causing the intermediate pieces 12 to circulate with the wheel 10. Of course also in this embodiment there may be provided toothings on the wheel and the intermediate pieces.

The invention is not restricted to the embodiment shown in the drawing, which can be varied within the scope of the invention. For instance it is possible to use the apparatus not only for tubes or rods having a circular outer circumference, but also for elongate bodies having a different kind of outer circumference, such as polygonal or the like. Furthermore instead of two wheels 2 a different number of wheels 2 may be used, such as three or four wheels symmetrically circumferentially spaced around the tube 1 and having axes of rotation 3 lying in the same transverseplane of the tube 1. In this case it is possible that the intermediate pieces 12 of the wheels 2 together surround the whole tube 1, whereby it is not possible that the cross-section of the tube 1 changes due to the pressure of the wheels 2.

I claim:

1. An apparatus for longitudinally driving an elongate body, comprising:
   at least one wheel and oppositely disposed retaining means, the wheel and retaining means being adapted to clamp the elongate body between them, the wheel having an axis of rotation lying substantially in a transverse plane of the elongate body and a substantially rigid circumferential surface around a circumference of the wheel;
   means for forcing the wheel and the retaining means toward each other to clamp the elongate body therebetween;
   driving means for rotating the wheel;
   a plurality of movably mounted intermediate pieces successively positioned about and circulating with the wheel, each intermediate piece having a longitudinal surface supported by the substantially rigid circumferential surface of the wheel, and wherein each intermediate piece is drivably urged by the wheel during engagement with the wheel and the elongate body such that each intermediate piece is successively driven by the wheel parallel to the elongate body while the wheel is rolling along each longitudinal surface of the intermediate piece, the plurality of intermediate pieces transforming rotational movement of the wheel into translational movement of the elongate body by means of friction between each intermediate piece and the elongate body; and
   elastic means joining each intermediate piece to the wheel and allowing the wheel to roll along each corresponding longitudinal surface, the elastic means supporting each intermediate piece on the wheel and maintaining successive positioning of the intermediate pieces on the wheel with limited movement with respect to the wheel.

2. The apparatus according to claim 1, wherein the substantially rigid circumferential surface includes toothing, the intermediate pieces being also provided on each corresponding longitudinal surface with a toothing, which is in engagement with the toothing of the respective wheel in the operative position of the respective intermediate piece.

3. The apparatus according to claim 2, wherein the toothing of the intermediate piece is a rectilineal face toothing.

4. The apparatus according to claim 1, wherein there is provided a guide for the intermediate pieces next to the wheel, the guide being adapted to bring the intermediate pieces into engagement with the elongate body.

5. The apparatus according to claim 4, wherein the guide comprises cam plates disposed on either side of the wheel and having a portion parallel to the direction of movement of the body, as well as run-on and run-off portions, and the intermediate pieces having cams cooperating with the cam plates.

6. The apparatus according to claim 5, wherein on each side of the intermediate piece there is provided one cam disposed in a longitudinal center of the intermediate piece.

7. The apparatus according to claim 1, comprising eight intermediate pieces provided at the circumference of the wheel.

8. The apparatus according to claim 1, wherein the wheels are positioned at equal intervals about a circumference of the elongate body.

9. The apparatus according to claim 1 wherein the longitudinal surface of each intermediate piece is substantially rigid.

10. The apparatus according to claim 1 wherein the elastic means comprises for each intermediate piece at least two springs with first ends of the springs connected to separate sides of the wheel and with second ends connected to non-engaging surfaces of the intermediate piece.

11. The apparatus according to claim 1 wherein the elastic means comprises an endless band around the circumferential surface and connected to each intermediate piece.

12. The apparatus according to claim 1 wherein the retaining means comprises a second wheel, the second wheel having an axis of rotation lying substantially in a transverse plane of the elongate body and a circumferential surface around a circumference of the second wheel; and a second plurality of successive, movably mounted intermediate pieces, circulating with the second wheel each having a longitudinal surface opposing the circumferential surface of the second wheel, and wherein each intermediate piece of the second plurality is drivably urged by the second wheel during engagement with the second wheel such that each intermediate piece is successively driven by the second wheel parallel to the elongate body while the second wheel is rolling along each longitudinal surface of the intermediate piece, the second plurality of the intermediate pieces transforming rotational movement of the second wheel into translational movement of the elongate body by means of friction between each intermediate piece and the elongate body; and second elastic means joining each intermediate piece of the second plurality to the second wheel, the second elastic means supporting each intermediate piece of the second plurality on the second wheel and maintaining the interrelationship between the successive intermediate pieces.

13. An apparatus for longitudinally driving an elongate body, comprising:
- at least one wheel and oppositely disposed retaining means, the wheel and retaining means being adapted to clamp the elongate body between them, the wheel and retaining means being adapted to clamp the elongate body between them, the wheel having an axis of rotation lying substantially in a transverse plane of the elongate body and a substantially rigid circumferential surface around a circumference of the wheel;
- means for forcing the wheel and the retaining means toward each other to clamp the elongate body therebetween;
- driving means for rotating the wheel;
- a plurality of movably mounted intermediate pieces successively positioned about and circulating with the wheel, each intermediate piece having a longitudinal surface supported by the substantially rigid circumferential surface of the wheel, an wherein each intermediate piece is drivably urged by the wheel during engagement with the wheel and the elongate body such that each intermediate piece is successively driven by the wheel parallel to the elongate body while the wheel is rolling along each longitudinal surface of the intermediate piece, wherein a driven portion of the longitudinal surface is defined by that portion of the longitudinal surface which is drivingly engaged by a corresponding tangential surface of the wheel so that the plurality of intermediate pieces transforms rotational movement of the wheel into translational movement of the elongate body by means of friction between each intermediate piece and the elongate body; and
- elastic means joining each intermediate piece to the wheel so that a constant distance is maintained between the driven portion of the longitudinal surface of each intermediate piece and the axis of rotation of the wheel during rolling movement of the wheel along the longitudinal surface, the elastic means supporting each intermediate piece on the wheel and maintaining successive positioning of the intermediate pieces on the wheel with limited movement with respect to the wheel.

14. The apparatus according to claim 13 wherein the longitudinal surface of each intermediate piece is substantially rigid.

15. The apparatus according to claim 13 wherein the elastic means comprises for each intermediate piece at least two springs with first ends of the springs connected to separate sides of the wheel and with second ends connected to non-engaging surfaces of the intermediate piece.

16. The apparatus according to claim 13 wherein the elastic means comprises an endless band around the circumferential surface and connected to each intermediate piece.

17. The apparatus according to claim 13 wherein the retaining means comprises a second wheel, the second wheel having an axis of rotation lying substantially in a transverse plane of the elongate body and a circumferential surface around a circumference of the second wheel; and a second plurality of successive, movably mounted intermediate pieces circulating with the second wheel each having a longitudinal surface opposing the circumferential surface of the second wheel, and wherein each intermediate piece of the second plurality is drivably urged by the second wheel during engagement with the second wheel such that each intermediate piece is successively driven by the second wheel parallel to the elongate body while the second wheel is rolling along each longitudinal surface of the intermediate piece, the second plurality of the intermediate pieces transforming rotational movement of the second wheel into translational movement of the elongate body by means of friction between each intermediate piece and the elongate body; and second elastic means joining each intermediate piece of the second plurality to the second wheel, the second elastic means supporting each intermediate piece of the second plurality on the second wheel and maintaining the interrelationship between the successive intermediate pieces.

18. The apparatus according to claim 13 and further comprising guide means for bringing the intermediate pieces into engagement with the elongate body.

19. The apparatus according to claim 18 wherein the guide means comprises a cam plates disposed on either side of the wheel and having a portion parallel to the direction of movement of the elongate body, and wherein each intermediate piece has cam portions cooperating with the cam plates.

* * * * *

UNITED STATES PATENT AND TRADEMARK OFFICE
CERTIFICATE OF CORRECTION

PATENT NO. : 5,263,624
DATED : November 23, 1993
INVENTOR(S) : Herman M. Zuidberg It is certified that error appears in the above-indentified patent and that said Letters Patent is hereby corrected as shown below:

Title page, item [56], col. 2, line 1, should read--886,454  5/1908  Wood 226/190--.
Title page, item [57], Abstract line 6, col. 2, delete "(1)", and insert --(11)--.

Col. 1, line 5, delete "07,595,546", insert --07/595,546--

Col. 1, line 21, delete "by the", insert --by and--

Col. 3, lines 53-54, after "substantially", delete --,--

Col. 7, lines 23-24, delete "the wheel and retaining means being adapted to clamp the elongate body between them,"

Signed and Sealed this

Seventh Day of June, 1994

BRUCE LEHMAN

*Attest:*

*Attesting Officer*      Commissioner of Patents and Trademarks